Patented July 11, 1939

2,165,525

UNITED STATES PATENT OFFICE 2,165,525

PROCESS FOR INCREASING PLASTICITY OF POLYMERS OF SUBSTITUTED BUTADIENES

Mortimer A. Youker, Wilmington, Del., assignor to E. I. du Pont de Nemours & Company, Wilmington, Del., a corporation of Delaware No Drawing. Application November 27, 1937, Serial No. 176,821

7 Claims. (Cl. 260—36)

This invention relates to rubber-like polymers of substituted butadienes having the general formula $CH_2=CX-CR=CH_2$ in which X is a halogen atom and R is a hydrogen atom or a hydrocarbon radical and more particularly to a process for producing plastic polymers resembling unvulcanized, plasticized natural rubber from polymers of the above-mentioned substituted butadienes deficient in plasticity.

Chloro-2-butadiene-1,3 (hereinafter called chloroprene) and similar substituted butadienes described by the above general formula have been converted into polymers of widely varying properties. Under suitable conditions, these halogen dienes may be polymerized directly to products which are strong and elastic and resemble vulcanized rubber. Under other conditions, it is possible to produce a plastic benzene-soluble polymer resembling unvulcanized rubber, which may be cured to a strong elastic product resembling vulcanized rubber.

Processes for producing polymers of chloroprene and related compounds have been described in U. S. Patents 1,950,432, 1,950,436, 1,950,438, 1,967,860, 1,967,861 and elsewhere. In general, elastic benzene-insoluble polymers are much more readily and cheaply prepared from monomeric chloroprene than are the plastic benzene-soluble polymers. For reasons which will be more fully discussed below, plastic polymers of chloroprene are very useful materials and it is, therefore, economically desirable to transform the cheap and readily prepared elastic polymers into plastic polymers. No methods have previously been known, however, for producing such a transformation. Moreover, no methods have hitherto been known for improving the plasticity and solubility of a chloroprene polymer having some plasticity and some benzene-solubility, except the addition of relatively large amounts of oils and similar rubber softeners, which has the disadvantage of impairing the strength of the polymers after curing.

It is an object of this invention to provide a new method for plasticizing and increasing the benzene-solubility of rubber-like polymers of compounds of the general formula $$CH_2=CX-CR=CH_2$$

in which X is a halogen atom and R is a hydrogen atom or a hydrocarbon radical. A further object is to provide a method for readily converting elastic, nonplastic and benzene-insoluble polymers of compounds of the above general formula into plastic and benzene-soluble materials resembling unvulcanized natural rubber. A still further object is to discover a plasticizer for rubber-like polymers of the above-mentioned compounds. Other objects will appear hereinafter.

These objects have been accomplished by treating polymers of the class described with unsymmetrical substituted hydrazine compounds of the group consisting of mono-aryl hydrazines, asymmetrical di-aryl hydrazines, salts of mono-aryl and asymmetrical di-aryl hydrazines and condensation products of mono-aryl and asymmetrical di-aryl hydrazines with aldehydes and ketones.

For the sake of brevity, the process will be described as applied to chloroprene polymers which constitutes the preferred form of the invention but it will be understood that it is likewise applicable to the other polymers of the class described.

The following examples are given as illustrative of the process of the invention but they are not to be construed as limitations thereon.

Example I

The polymer to be plasticized was prepared by emulsifying 200 parts by weight of chloroprene in 800 parts by weight of a 1% aqueous solution of the sodium salt of isobutyl naphthalene sulfonic acid, allowing the polymerization to procede in a thermally insulated vessel until the liberated heat of polymerization had caused the temperature of the dispersion to rise from 16° C. to 36° C., and arresting the polymerization by adding a dispersion made by emulsifying one part of phenyl-beta-naphthylamine dissolved in benzene in a volume of the emulsifying solution equal to that of the benzene. The polymer was then isolated by coagulating with alum solution, passing the coagulum through corrugated rolls, washing with ethyl alcohol, and drying in air. A tough nonplastic irregular mass, insoluble in benzene, resulted. This material was plasticized by immersing it in an equal weight of toluene containing 1% of phenyl hydrazine and 0.5% of glacial acetic acid, based on the weight of the dried polymer. After 24 hours without agitation, or 4 hours if kneaded in an internal mixer, the polymer had completely dispersed in the toluene, forming a very viscous, dough-like mass. The solvent was then removed by milling for a short time on a rubber mill at 50° C. The product was obtained as a smooth sheet of a soft, plastic, benzene-soluble material closely resembling well-plasticized natural rubber. It has a plasticity number of 104 and a recovery of 7, measured in thousandths of an inch, as determined by the Williams plastometer. That is, when a sample of this plastic polymer having a volume of 0.152 cu. in. and a diameter of 0.625 inch was heated to 80° C. for 15 minutes and then compressed under a weight of 11.0 pounds between parallel plates for three minutes, the resulting thickness was 0.104 inch, which increased by 0.007 inch when freed from pressure for one minute at room temperature.

*Example II*

The polymer to be plasticized was prepared according to the method of Example V of U. S. Patent 1,950,436 except that the polymerization was allowed to proceed until the isolated product had a plasticity number of 122 and a recovery of 22, indicating that it was not plastic enough to be readily handled in some of the more difficult processes of the rubber art, such as tubing. One part by weight of phenyl hydrazine acetate was incorporated into 500 parts of this polymer on a rubber mill at room temperature by the ordinary method used for compounding natural rubber. The polymer became much more plastic as indicated by a plasticity number of 86 and a recovery of 8. The solubility was also increased. That is, whereas the original polymer dissolved very slowly in benzene and finally gave a dilute solution of high viscosity, the plasticized polymer dissolved faster and gave a much less viscous solution at the same concentration. Phenyl hydrazine borate and the free base itself gave similar results.

*Example III*

Used articles made from plastic chloroprene polymer (prepared according to Example 15 of U. S. patent application of Starkweather and Collins, Serial No. 156,518, filed July 30, 1937) by compounding with zinc oxide, magnesium oxide, and rosin and curing (as described in the above application) were broken up into fine crumbs by first cutting into small pieces and then passing these through a closely set rubber mill and removing foreign substances such as cloth and wire. The polymer at this stage showed no tendency to cohere and only a very slight plasticity. One hundred parts of this was soaked in 350 parts of benzene containing 3 parts of phenyl hydrazine. The resulting gel was kneaded with several portions of ethyl alcohol to remove most of the benzene and was then milled on a rubber mill until the residual benzene and alcohol were removed. Aceto-acetic ethyl ester (2 parts) was then incorporated, together with one part of phenyl beta-naphthylamine as an antioxidant and one part of tetramethyl thiuram disulphide as a stabilizer (see application of Walker, Serial No. 154,212 filed July 17, 1937). The final product was a plastic, tacky, cohesive sheet. This could be compounded with the usual rubber compounding ingredients and also blended with uncured plastic chloroprene polymers. For example, 50 parts of the above reclaimed polymer and 50 parts of uncured plastic polymer were incorporated with 45 parts of carbon black (channel black), 10 parts of zinc oxide, 10 parts of magnesium oxide, 5 parts of rosin, and 3 parts of cottonseed oil and cured for 40 minutes at 153° C. The product was similar to vulcanized rubber.

The process illustrated by the above examples is subject to considerable variation as regards the plasticizer used, the polymer treated and the method of applying the plasticizer.

The plasticizer may be (1) a mono-aryl hydrazine such as phenyl hydrazine, orthotolyl hydrazine, para-bromo-phenyl hydrazine, meta-nitrophenyl hydrazine, or alphanaphthyl hydrazine; (2) an asymmetrical di-aryl hydrazine such as diphenyl hydrazine and the like; (3) a salt of any of the above hydrazines (for example, phenyl hydrazine acetate, chloracetate, or borate), and (4) a condensation product of any of the above hydrazines with aldehydes and ketones (such as acetone phenyl hydrazone). Mono-aryl-hydrazines are preferred and phenyl hydrazine is especially preferred. The latter is preferably used in the form of its salts, since they are in general more readily handled than the free base. Mixtures of the above agents may be used as desired.

The rubber-like polymers with which this invention is concerned may be derived from any substituted butadiene of the general formula $CH_2=CX-CR=CH_2$ in which X is a halogen and R is hydrogen or a hydrocarbon radical, which substituted butadiene is capable of forming a rubber-like polymer. Those butadienes in which R is hydrogen or methyl are preferred and especially preferred are chloro-2-butadiene-1,3; bromo-2-butadiene-1,3; chloro-2-methyl-3-butadiene-1,3 and bromo-2-methyl-3-butadiene-1,3. The polymers may vary from highly elastic, insoluble, tough, rubber-like substances to plastic, soluble rubber-like substances. Thus a rubber-like polymer commonly regarded as plastic is a suitable starting material within the scope of the invention if an increase in plasticity results in a useful product. The rubber-like polymers may be prepared from substituted butadienes in the presence or absence of solvents, other polymerizable compounds, catalysts, and inhibitors of polymerization either in the "massive" state or dispersed in water, or may represent articles manufactured from the plastic polymers by a method similar to vulcanization. All these processes are fully described in the prior art patents above cited.

The choice of method for applying the reagent depends upon the state of the material to be plasticized, the degree of plasticization desired, and the physical properties of the plasticizer. If the polymer to be plasticized is an insoluble solid, as in Example I, it is most convenient to allow it to react with a solution of the plasticizer preferably with mechanical mixing. Suitable solvents are those which swell the insoluble polymer, such as the liquid aromatic hydrocarbons (benzene, toluene, xylene, etc.), carbon disulfide, and carbon tetrachloride. If the polymer is in the form of an aqueous dispersion or latex, it may be advantageously treated by adding the plasticizer as an aqueous solution or dispersion. Alternatively, the polymer may be coagulated and the wet coagulum treated like the dry polymer above, or the polymer may be converted to a dry, finely divided form by spray drying of the latex according to methods known in the art, which form is particularly well adapted to treatment by means of the plasticizers. If the polymer to be treated is already plastic (as in Example II), the plasticizer is readily introduced on a rubber mill by methods well known in the art of compounding natural rubber. If the polymer is somewhat soluble, it may first be dispersed in a suitable solvent, to which the plasticizer is then added. In general, the presence of a solvent, of the type discussed above, is desirable during the plasticization. If desired, the solvent may thereafter be removed by evaporation or distillation or by exposure to a medium such as alcohol or acetone which dissolves the solvent but not the polymer. Alternatively the solvent may be allowed to remain, forming a cement.

The quantity of plasticizer used depends mainly upon the effect to be produced. When a tough, elastic polymer is to be plasticized, as in Example I, 1% of the free base by weight or an equivalent quantity of salt or condensation product will be found to give good results. Larger quantities may be desirable when a more rapid reaction is desired or when the polymer is particularly resistant to plasticizing, for example when the polymerization described in Example I is allowed to proceed to completion. On the other hand, when the polymer is originally somewhat plastic, as in Example II, quantities considerably less than 1% will be found sufficient. The preferred range is from 0.1 to 5.0% of the weight of the polymer to be plasticized. The preferred temperature range for carrying out the process is 10° to 60° C. Below this temperature range, the reaction is usually undesirably slow, while at higher temperatures undesirable reactions may take place. Atmospheric pressure is preferred although the process is operative at other pressures.

If desired, the hydrazine may be removed by washing with a solvent such as alcohol or acetone which does not dissolve the polymer, or more conveniently by milling into the polymer a compound such as acetoacetic ester which reacts readily and completely with the hydrazine.

The plastic products of this invention are readily converted by heat, particularly in the presence of metallic oxides such as those of zinc and magnesium to tough, elastic, nonplastic, and insoluble substances closely resembling vulcanized natural rubber. Thus, the products of this invention may be compounded with the materials used for reinforcing, cheapening, preserving and otherwise altering natural rubber, then compressed into the desired shape and form, and finally converted by the application of heat to elastic articles such as are made from natural rubber. The choice of compounding ingredients, methods of processing, and fields of utilization for plastic chloroprene polymers behaving in a manner similar to those produced by this invention have already been discussed in U. S. Patent 1,950,436 and also in Ind. Eng. Chem. 25, 1219 (1933), and 26, 33 (1934), Rubber Age (N. Y.) Dec. 10, 1931, page 213, and the "Du Prene Manual", published by E. I. du Pont de Nemours & Co. in August 1, 1934. The statements made in these references apply in general to the product of the present invention as well. The product of this invention, in common with the chloroprene products already described, while being in general very similar to natural rubber in physical properties, has several important advantages thereover. For example, it is converted without the use of sulfur to the elastic form and in this form is very resistant to the action of oxygen and ozone and of petroleum oils and solvents.

Suitable changes may be made in the details of the process. Any modification or variation in the process which conforms to the spirit of the invention is intended to be included within the scope of the appended claims.

I claim:

1. A method of increasing the plasticity of an elastic polymer of the group consisting of polymers of substituted butadienes of the formula $CH_2=CX-CR=CH_2$ in which X is a halogen atom and R is a hydrogen or a hydrocarbon radical, which comprises treating said polymer with an unsymmetrical substituted hydrazine compound of the group consisting of mono-aryl hydrazines, asymmetrical di-aryl hydrazines, salts of mono-aryl- and asymmetrical di-aryl hydrazines, and the condensation products of mono-aryl and asymmetrical di-aryl hydrazines with aldehydes and ketones.

2. A process according to claim 1 in which R is hydrogen.

3. A process according to claim 1 in which R is the methyl radical.

4. A method of increasing the plasticity of an elastic polymer of chloro-2-butadiene-1,3, which comprises treating said polymer with an unsymmetrical substituted hydrazine compound of the group consisting of mono-aryl hydrazines, asymmetrical di-aryl hydrazines, salts of mono-aryl and asymmetrical di-arl hydrazines, and condensation products of mono-aryl and asymmetrical di-aryl hydrazines with aldehydes and ketones.

5. The process which comprises treating an elastic polymer of chloro-2-butadiene-1,3 with an unsymmetrical substituted hydrazine compound of the group consisting of mono-aryl hydrazines, asymmetrical di-aryl hydrazines, salts of mono-aryl and asymmetrical di-aryl hydrazines, and condensation products of mono-aryl and asymmetrical di-aryl hydrazines with aldehydes and ketones in an amount equal to 0.1 to 5.0% by weight of the polymer to produce an increase in the plasticity of the polymer and an increase in solubility in benzene.

6. A plastic benzene soluble material obtained by treating an elastic polymer of the group consisting of polymers of substituted butadienes of the formula $CH_2=CX-CR=CH_2$, in which X is a halogen atom and R is a hydrogen atom or a hydrocarbon radical with an unsymmetrical substituted hydrazine compound of the group consisting of mono-aryl hydrazines, asymmetrical di-aryl hydrazines, salts of mono-aryl and asymmetrical di-aryl hydrazines, and condensation products of mono-aryl and asymmetrical di-aryl hydrazines with aldehydes and ketones.

7. A plastic benzene-soluble material obtained by treating an elastic polymer of chloro-2-butadiene-1,3 with an unsymmetrical substituted hydrazine compound of the group consisting of mono-aryl hydrazines, asymmetrical di-aryl hydrazines, salts of mono-aryl and asymmetrical di-aryl hydrazines, and condensation products of mono-aryl and asymmetrical di-aryl hydrazines with aldehydes and ketones.

MORTIMER A. YOUKER.